United States Patent
Cecala et al.

(10) Patent No.: US 8,009,515 B2
(45) Date of Patent: Aug. 30, 2011

(54) GROUND THREAT LOCATION FOR AN AIRCRAFT

(75) Inventors: Joseph F. Cecala, Endwell, NY (US); Carl R. Herman, Owego, NY (US); Stephen C. Moraites, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 429 days.

(21) Appl. No.: 12/315,224

(22) Filed: Dec. 1, 2008

(65) Prior Publication Data

US 2010/0135120 A1   Jun. 3, 2010

(51) Int. Cl.
*G01S 3/80* (2006.01)
(52) U.S. Cl. .................................... 367/124; 367/906
(58) Field of Classification Search .............. 367/906, 367/129, 120, 124, 126, 128
See application file for complete search history.

(56) References Cited

U.S. PATENT DOCUMENTS

| | | | |
|---|---|---|---|
| 5,812,269 A | 9/1998 | Svetkoff et al. | |
| 5,973,998 A | 10/1999 | Showen et al. | |
| 6,230,042 B1 * | 5/2001 | Slettenmark | 600/424 |
| 2001/6178141 | 1/2001 | Duckworth et al. | |
| 2001/6208587 | 3/2001 | Martin | |
| 2003/6615143 | 9/2003 | Wu | |
| 2004/6757219 | 6/2004 | Larosa et al. | |
| 2005/6847587 | 1/2005 | Patterson et al. | |
| 2005/6965541 | 11/2005 | Lapin et al. | |
| 2006/0044942 A1 | 3/2006 | Brinn et al. | |
| 2006/7054228 | 5/2006 | Hickling | |
| 2006/0146648 A1 | 7/2006 | Ukita | |
| 2006/7126877 | 10/2006 | Barger et al. | |
| 2006/0280033 A1 | 12/2006 | Baxter et al. | |
| 2010/0135120 A1 * | 6/2010 | Cecala et al. | 367/129 |

FOREIGN PATENT DOCUMENTS

DE    19909066 A1    9/1999

* cited by examiner

*Primary Examiner* — Dan Pihulic
(74) *Attorney, Agent, or Firm* — Tarolli, Sundheim, Covell & Tummino LLP

(57) ABSTRACT

Systems and methods are provided for locating threats to an aircraft that are located on the ground. Associated bearings are determined from an aircraft for each of a plurality of detected shots from a threat at ground level. A plurality of pairs of bearings are selected, and a weight value is calculated for each selected pair of bearings. An estimated position for the threat is determined from each selected pair of bearings. An improved estimation of the position for the threat is calculated as a weighted combination of the estimated positions.

20 Claims, 4 Drawing Sheets

GROUND THREAT LOCATION FOR AN AIRCRAFT

TECHNICAL FIELD

The present invention relates to electronic systems, and specifically relates to a ground threat location system for an aircraft.

BACKGROUND OF THE INVENTION

Aircraft are used in a wide variety of applications, both civilian and military, including travel, transportation, fire fighting, surveillance, and combat. Various aircraft have been designed to fill the wide array of functional roles defined by these applications, including balloons, dirigibles, traditional fixed wing aircraft, flying wings and helicopters.

In general, aircraft travel at a sufficient altitude to substantially eliminate any threat posed to the aircraft from threats posed by personnel on the ground. For some applications, however, it is necessary to travel at comparably low altitudes for long periods of time, exposing the aircraft to threats from the ground. Similar exposure takes place in other applications during take-offs and landings of the aircraft.

SUMMARY OF THE INVENTION

In accordance with one aspect of the present invention, a method is provided for locating threats to an aircraft that are located on the ground. Associated bearings are determined from an aircraft for each of a plurality of detected shots from a threat at ground level. A plurality of pairs of bearings are selected, and a weight value is calculated for each selected pair of bearings. An estimated position for the threat is determined from each selected pair of bearings. An improved estimation of the position for the threat is calculated as a weighted combination of the estimated positions.

In accordance with another aspect of the present invention, a system is provided for locating threats to an aircraft that are located on the ground. A bearing determination element is configured to determine associated bearings from an aircraft for each of a plurality of detected shots from a threat at ground level. A position estimation element is configured to determine an estimated position for the threat from each of a plurality of pairs of bearings. A position aggregation element configured to calculate an improved estimated position for the threat from the estimated positions.

In accordance with yet another aspect of the present invention, a computer readable medium is provided for storing executable instructions that can be executed by a processor to locate threats to an aircraft that are located on the ground from sensor data. The executable instructions include a position estimation element that is configured to determine a plurality of estimated positions for a threat at ground level from the sensor data. A weight determination element is configured to calculate an associated weight for each of the estimated positions. An averaging element is configured to calculate a weighted average of the estimated positions to provide an improved estimated position for the threat.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

The present invention relates to systems and methods for locating threats located on the ground from an aircraft such that appropriate countermeasures can be taken. Visual or auditory sensors can be utilized to determine the bearing to the threat, that is, the direction from the aircraft to the threat. Two bearings taken from positions separated in space, and a position of the threat can be estimated via triangulation from the two bearings and the known distance. In accordance with an aspect of the present invention, a larger number of bearings to the threat can be taken, for example, from each shot in a series of automatic gunfire, and a plurality of pairs of bearings can be selected from these bearings. The positions estimated from each pair of bearings can be weighted according to the distance separating the pairs, and the estimated positions can be combined in a weighted averaging arrangement to provide a more accurate estimate.

Figure 1:
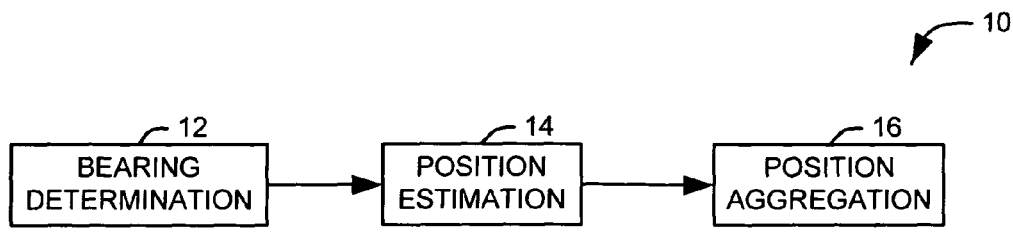
FIG. 1 illustrates a system for locating threats to an aircraft that are located on the ground in accordance with an aspect of the present invention.

FIG. 1 illustrates a system 10 for locating threats to an aircraft that are located on the ground in accordance with an aspect of the present invention. The system 10 comprises a bearing determination element 12 that is configured to determine associated bearings from the aircraft to each of a plurality of detected shots from a threat at ground level. Specifically, the bearing determination element 12 identifies shots of weapon fire from the ground, and determines the direction of incidence of light from a muzzle flash or a sonic disturbance from each shot. Accordingly, the bearing determination element 12 can comprise one or more sensor elements for detecting the sound or light emitted by the shots, as well as appropriate circuitry or software for calculating the bearing from the airplane to the detected shot. The bearing detection element 12 can also receive input from other aircraft systems (not shown) indicating at least one of the position, velocity, and orientation of the aircraft, such that at least a relative position of the aircraft can be determined at the time each shot is detected. Accordingly, each shot can have an associated determined bearing and position of the aircraft.

A position estimation element 14 is configured to determine an estimated position for the threat. The position estimation element 14 first determines a set of shots that represent a single burst of automatic weapon fire. This can be accomplished by grouping shots that are spatially and temporally proximate. For example, a burst of shots can be identified when a group of shots are within a given degree of arc on the sensor, consecutive shots are separated by no more than a first threshold time period, and the entire burst has a time period less than a second threshold time period. The position estimation element 14 then organizes the set of shots from the burst, and their associated bearings, into pairs. For example, a predetermined number of pairs of shots can be selected having the greatest displacement between their associated positions. It will be appreciated that a given shot can be represented in multiple pairings. From each of the selected plurality of pairs of bearings, the position of the threat can be estimated, for example, via triangulation, to form a plurality of estimates of the position of the threat.

A position aggregation element 16 is configured to calculate an improved estimated position for the threat from the estimated positions. The position aggregation element 16 calculates a weight for each of the position elements as a function of the displacement between the associated aircraft positions of the shots used to calculate the position estimate. The position aggregation element 16 then calculates a weighted average of the estimated positions to provide a more accurate estimate of the position. This position can be reported to an operator, along with a confidence value for the improved estimation, to allow appropriate countermeasures to the threat to be pursued.

Figure 2:
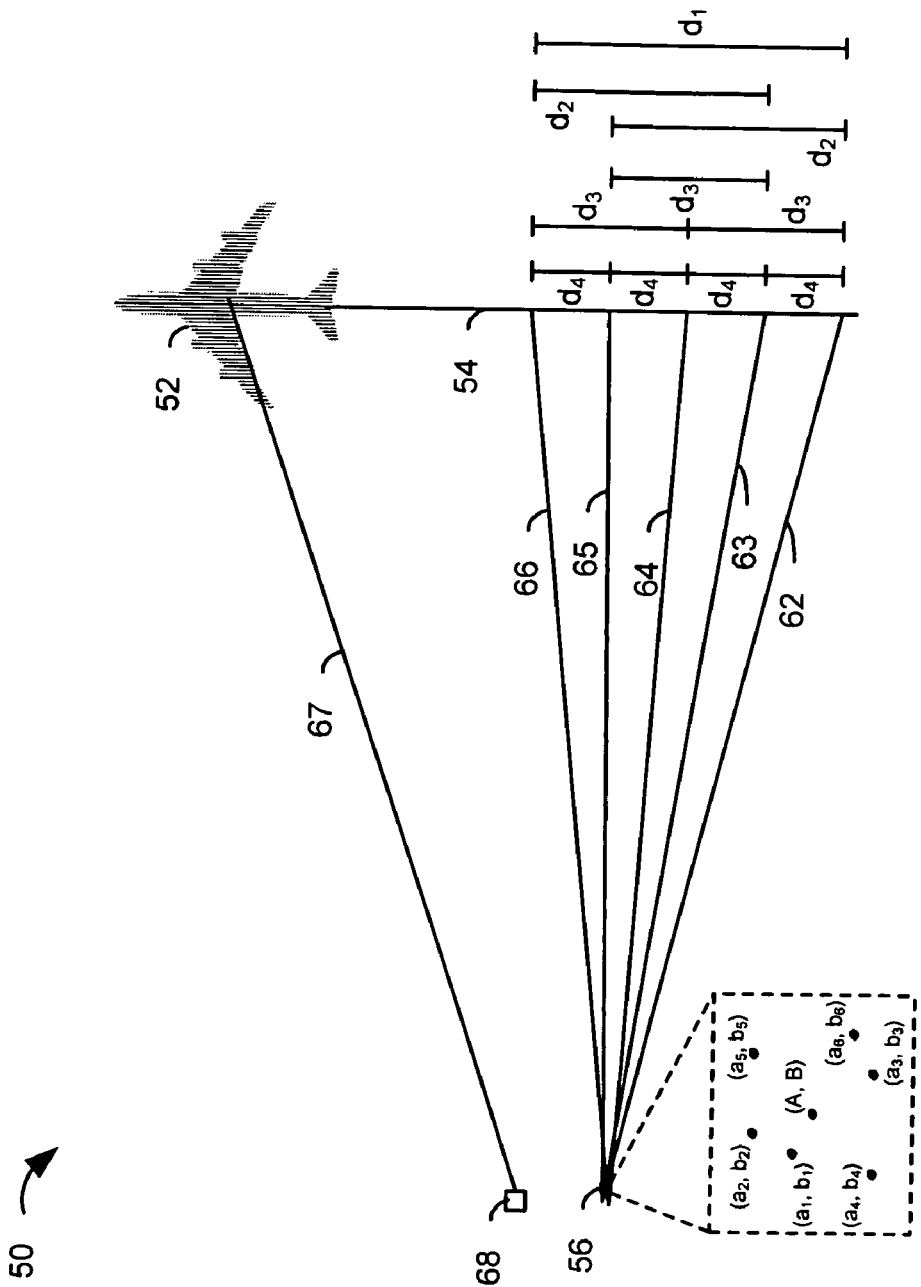
FIG. 2 illustrates a diagram of an aircraft utilizing a threat location system in accordance with an aspect of the present invention and a threat to the aircraft.

FIG. 2 illustrates a diagram 50 of an aircraft 52 utilizing a threat location system in accordance with an aspect of the present invention, and a threat 54 to the aircraft. In the diagram, for the purpose of example, the airplane 52 is assumed to be travelling at a constant velocity in a straight line, such that a displacement along the flight path 56 of the airplane is functionally equivalent to the passage of a period of time. It will be appreciated, however, that the system constructed in accordance with the present invention is not limited to use in air travel at a constant velocity and that the system can include or be operatively connected to mechanisms for measuring both a current position of an aircraft and the passage of time.

For each of a plurality of shots by the threat 54 at ground level, a bearing 62-67 can be taken from the airplane to the threat. For example, a muzzle flash from a weapon used by the threat can be imaged by the aircraft or a sonic disturbance from the weapon can be sensed at a plurality of microphones and a bearing can be determined via time of arrival measurements. In accordance with an aspect of the present invention, the time interval between consecutive shots can be reviewed to determine which shots belong to a single burst of automatic weapon fire. By reviewing the shot timing, it is possible to discount data that might come from a different threat 68. In the illustrated diagram, the shots corresponding to the first five bearings 62-66 occur with relatively short periods of time from one another, while the shot corresponding to the final bearing 67 occurs significantly later. This final shot is thus removed from consideration in locating the threat.

Each of the remaining bearings 62-66 are separated by respective associated distances $d_1$, $d_2$, $d_3$, and $d_4$. The bearings can be paired as to select a number of bearings having the largest distance values. In the illustrated example, six selected pairs can include a first pair comprising a first bearing 62 and a fifth bearing 66, a second pair comprising the first bearing 62 and a fourth bearing 65, a third pair comprising a second bearing 63 and the fifth bearing 66, a fourth pair comprising the first bearing 62 and the third bearing 64, a fifth pair comprising the third bearing 64 and the fifth bearing 66, and a sixth pair comprising the second bearing 63 and the fourth bearing 65. It will be appreciated that the points along the flight path 56 of the aircraft 52 at which each bearing 62-67 in a pair of bearings was taken are separated by an associated distance, with the first pair having an associated distance of $d_1$, the second and third pairs having associated distances of $d_2$, and the fourth, fifth, and sixth pairs having an associated distance of $d_3$.

From each of the six pairs of bearings, respective intersection points can be determined via triangulation. Essentially, from the known bearings and the separation between the bearings, the intersection point $(a_i, b_i)$ of the two bearing lines can be determined. Each of these intersection points represents an estimated position for the threat 54. In accordance with an aspect of the present invention, an improved estimation of the position for the threat (A, B) can be determined as a weighted average of the determined coordinate estimates $(a_i, b_i)$. Each pair of bearings can be weighted, for example, according to the interbearing distance associated with the pair. Accordingly, for the illustrated example, the improved estimation of the threat position (A, B) can be determined as:

$$A = \frac{a_1 d_1 + a_2 d_2 + a_3 d_2 + a_4 d_3 + a_5 d_3 + a_6 d_3}{(d_1 + 2d_2 + 3d_3)} \quad \text{Eq. 1}$$

$$B = \frac{b_1 d_1 + b_2 d_2 + b_3 d_2 + b_4 d_3 + b_5 d_3 + b_6 d_3}{(d_1 + 2d_2 + 3d_3)} \quad \text{Eq. 2}$$

Figure 3:
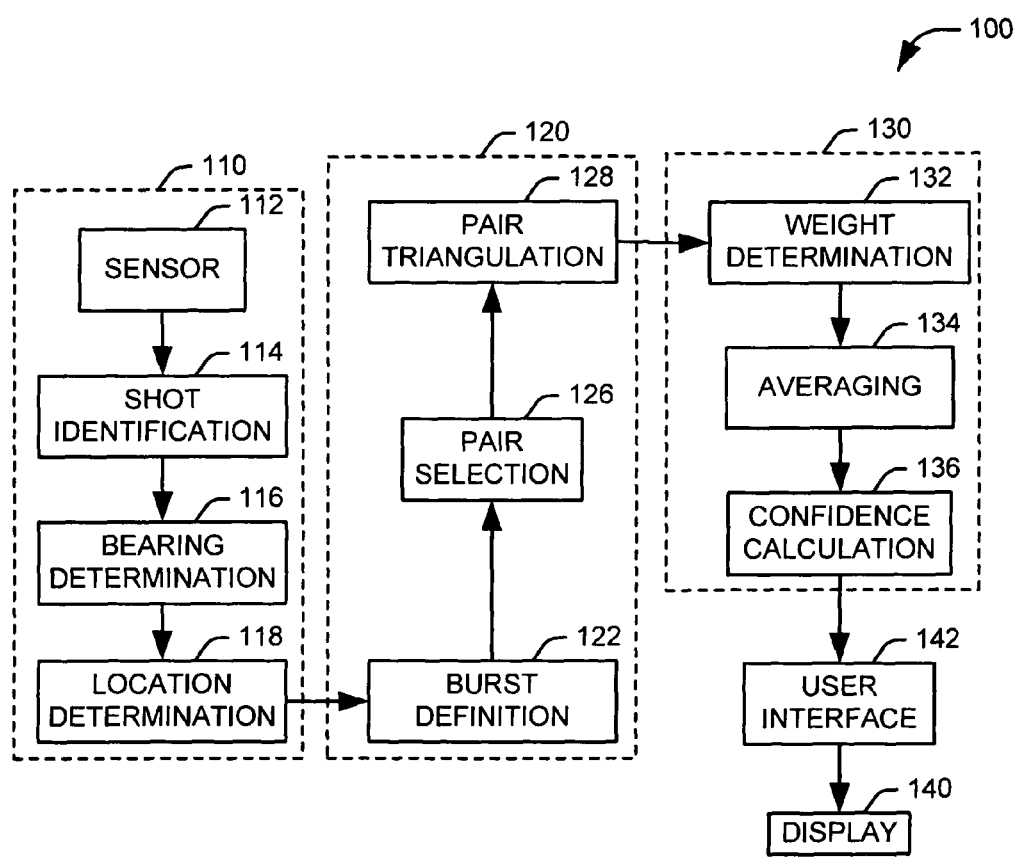
FIG. 3 illustrates an exemplary threat location system for locating threats to an aircraft that are located on the ground.

FIG. 3 illustrates an exemplary threat location system 100 for locating threats to an aircraft that are located on the ground. The system comprises a bearing determination element 110 that is configured to determine associated bearings from an aircraft for each of a plurality of detected shots from a threat at ground level. The bearing determination element 110 includes a sensor 112 that detects weapon fire from the ground. For example, the sensor 112 can comprise one or more image sensors that detect light in one or both of the visible spectrum and the infrared spectrum. Alternatively, the sensor 112 can include at least two acoustic sensors that detect sonic disturbances caused by weapon fire. A shot identification element 114 is configured to receive data from the sensor 112 and identify shots within the sensor data. The shot identification element 114 can also identify respective associated times of the identified shots.

A bearing determination element 116 is configured to determine an associated bearing from the aircraft for each identified shot. In one implantation, one or more images associated with each shot can be analyzed to determine a bearing to the shot from the aircraft from the known properties of one or more image sensors and the position of the shot within each image. Alternatively, the bearing calculator 116 is configured to calculate a bearing from respective times of arrival of a sound of a given shot at the at least two acoustic sensors. A location determination element 118 is configured to determine a relative location of the aircraft at the associated time of each shot. The location determination element 118 can include, for example, a GPS assembly, an operative connection to a GPS assembly associated with the aircraft, or an operative connection with one or more other aircraft systems to continuously provide velocity and heading updates to the system 100.

The system further comprises a position estimation element 120 that is configured to determine a plurality of estimated positions for the threat from each of a plurality of pairs of bearings. A burst definition element 122 is configured to identify a series of shots representing a single burst of shots from an automatic weapon. A series of shots can be reviewed to determine intershot intervals between consecutive shots in the series. In the illustrated implementation, a series of shots have a regular intershot interval can be labeled as a single burst. Alternatively, shots that are spatially and temporally proximate can be grouped, with a group being defined when a group of shots are within a given degree of arc on the sensor, consecutive shots are separated by no more than a first threshold time period, and the entire burst has a time period less than a second threshold time period.

A pair selection element 126 is configured to select a plurality pairs of shots, and their associated bearings, from an identified burst of automatic weapon fire. For example, all pairs of bearings that were taken from the aircraft at points separated in space by a predetermined distance can be selected. Alternatively, a predetermined number of pairs that were taken from the aircraft at points separated in space by the largest possible distance can be selected. A pair triangulation element 128 configured to calculate an estimated position for each of the selected pairs of bearings. With the known values for the bearings and the known separation between the locations at which the bearings were taken, it is possible to estimate the distance of either locations at which the bearings were taken to the point of origin of the shots, such that:

$$D_{1,T} = \frac{D_{1,2}\sin(\alpha_1)}{\sin(180 - \alpha_1 - \alpha_2)} \quad \text{Eq. 3}$$

where $\alpha_1$ is a first bearing, $\alpha_2$ is a second bearing, $D_{1,2}$ is the distance between the points at which the bearings were taken, and $D_{1,T}$ is the distance between which the first bearing was taken and the threat.

From the known position at which the bearing was taken, the calculated distance to the threat, and the known bearing to the threat, an exact position can be estimated. This can be repeated for each of the selected pair of bearings to produce a plurality of estimates.

The plurality of estimated bearings can be provided to a position aggregation element 130 that is configured to calculate an improved estimated position for the threat from the estimated positions. A weight determination element 132 is configured to calculate a weight value for each of the plurality of pairs of bearings. The weight determination element 132 can determine the weight for each pair of bearings as a function of the distance between the points at which the bearings in the pair were taken, referred to herein as the interbearing distance. In one implementation, the pair of bearings having the largest interbearing distance is assigned a weight of one, and the weight assigned to each other pair of bearings is equal to the ratio of the interbearing distance associated with the pair of bearings to the largest interbearing distance.

An averaging element 134 is configured to calculate a weighted average of the plurality of estimated positions to provide the improved estimated position. Each pair of bearings can provide an estimated position having at least two associated geographical coordinates, for example, a latitude coordinate and a longitude coordinate. In one implementation, an elevation coordinate can be provided from an elevation map (not shown) associated with the aircraft and an altitude of the aircraft provided by an aircraft system. It will be appreciated, however, that the triangulation process can be modified to produce an elevation coordinate along with the latitude and longitude coordinates. For each of n estimated positions $(a_i, b_i)$, the value of a given coordinate, $a_i$, can be multiplied by the weight value, $w_i$, associated with the position and the weighted coordinates can be summed to produce an improved estimated position $(a_f, b_f)$, such that:

$$a_f = \frac{\sum_{i=1}^{n} a_i w_i}{\sum_{i=1}^{n} w_i}; \quad b_f = \frac{\sum_{i=1}^{n} b_i w_i}{\sum_{i=1}^{n} w_i} \quad \text{Eq. 4}$$

The position aggregation element 130 can further comprise a confidence calculation element 136 that calculates a confidence measure for the improved estimation of the threat position. For example, a standard deviation associated with the weighted average of each coordinate can be calculated, and from this value, a desired confidence range (e.g., 95%) can be determined. The improved estimation of the position, along with the calculated confidence, can be displayed to a user at an associated display 140 via a user interface 142. The user can then initiate any appropriate countermeasures to the threat based on the determined position of the threat and the confidence in that position.

Figure 4:
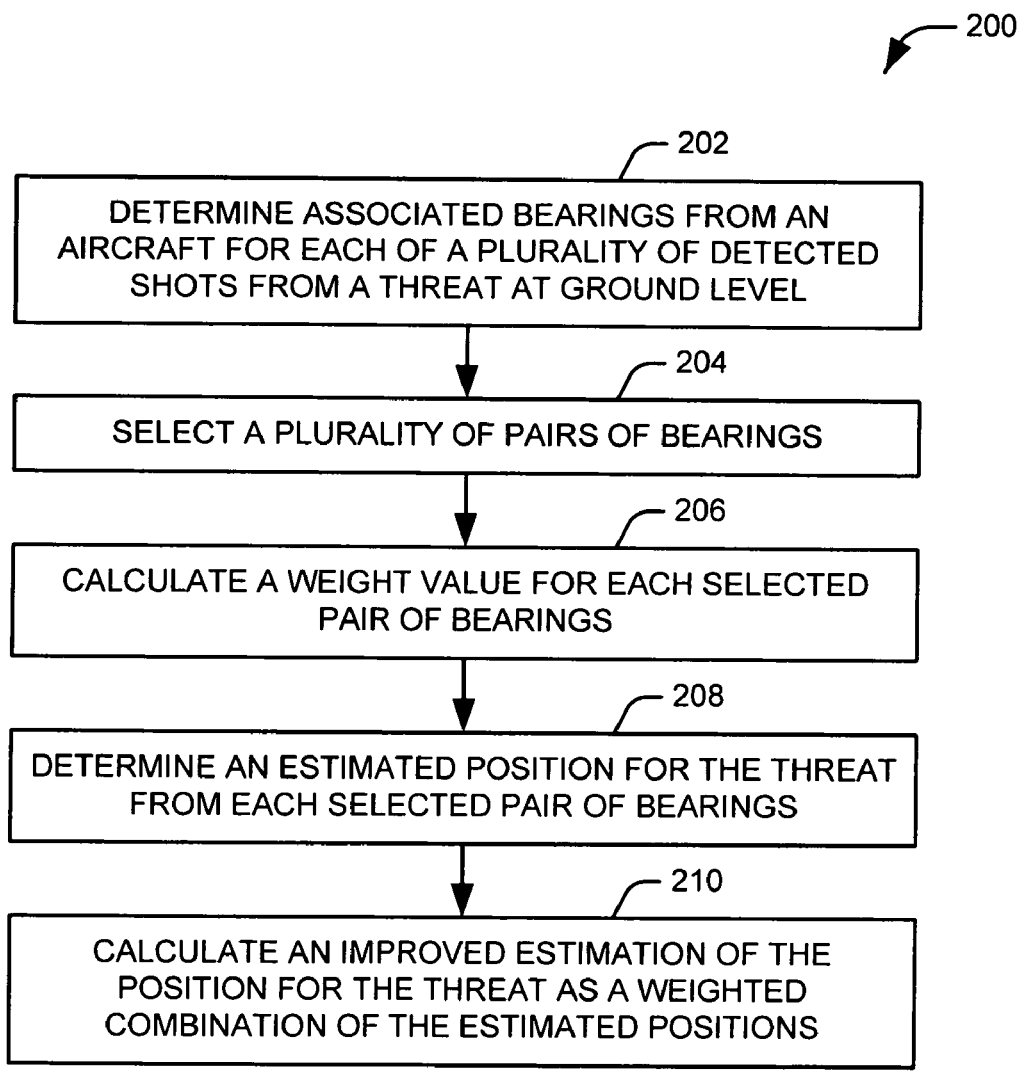
FIG. 4 illustrates a method for locating threats to an aircraft that are located on the ground in accordance with an aspect of the present invention.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 4 illustrates a method 200 for locating threats to an aircraft that are located on the ground in accordance with an aspect of the present invention. At 202, associated bearings are determined from the aircraft for each of a plurality of detected shots from a threat at ground level. This can be accomplished through analysis of electromagnetic radiation or sonic disturbances from the shots detected at an appropriate sensor. At 204, a plurality of pairs of bearings are selected for analysis. For example, a series of shots representing a single burst of shots from an automatic weapon can be identified, and the plurality of pairs of bearings can be selected from shots within the identified series. From the shots belonging to the identified burst, a plurality of pairs of bearings can be selected. For example, all pairs of bearings in the identified series that were taken from the aircraft at points separated in space by a predetermined distance can be selected. Alternatively, a predetermined number of pairs of bearings that were taken from the aircraft at points separated in space by the largest possible distance can be selected.

At 206, a weight value is calculated for each selected pair of bearings. For example, a relative position of the aircraft at the time of each detected shot can be determined, and a difference in the position of the aircraft between a first detected shot and a second detected shot can be determined for each of the plurality of selected pairs of bearings. The weight value for each selected pair can be determined as a function of the determined difference in position of the aircraft. At 208, an estimated position for the threat can be determined from each selected pair of bearings. For example, an estimated position for the threat can be determined from each selected pair of bearings by determining respective intersection points associated with the selected pairs of bearings via triangulation.

At 210, an improved estimation of the position of the threat is determined as a weighted combination of the estimated positions. For example, the improved estimation can be determined as a weighted average of the estimated positions from each set of bearings, such that the value of a coordinate defining the improved estimation of the position is equal to a weighted sum of associated coordinate values from the estimated positions divided by the sum of the calculated weight values. A confidence measure associated with the calculated improved estimation can be calculated with the weighted average. For example, the confidence measure can include a ninety-five percent confidence range around the improved estimation of the threat position.

Figure 5:
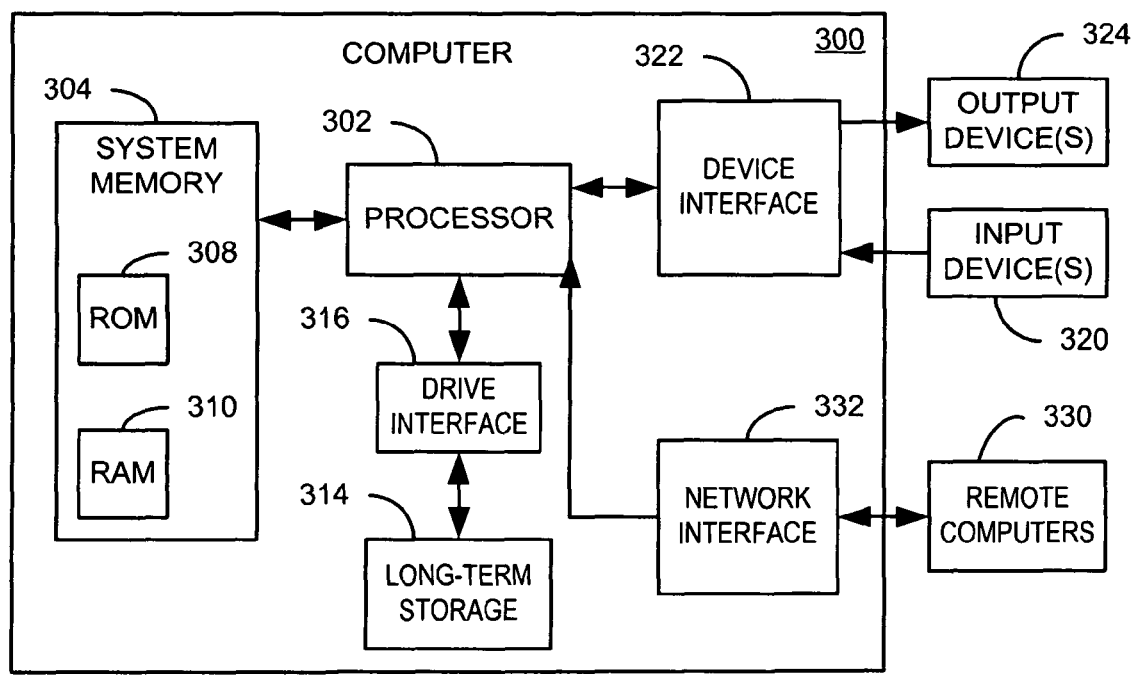
FIG. 5 illustrates a computer system that can be employed to implement systems and methods described herein, such as based on computer executable instructions running on the computer system.

FIG. 5 illustrates a computer system 300 that can be employed to implement systems and methods described herein, such as based on computer executable instructions running on the computer system. The computer system 350 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 350. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus by one or more a parallel port, a serial port or a universal serial bus (USB). One or more output device(s) 324, such as a visual display device or printer, can also be connected to the processor 302 via the device interface 322.

The computer system 300 may operate in a networked environment using logical connections (e.g., a local area network (LAN) or wide area network (WAN) to one or more remote computers 330. A given remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim the following:

1. A method for locating threats to an aircraft that are located on the ground, comprising:
    determining associated bearings from an aircraft for each of a plurality of detected shots from a threat at ground level;
    selecting a plurality of pairs of bearings;
    calculating a weight value for each selected pair of bearings;
    determining an estimated position for the threat from each selected pair of bearings; and
    calculating an improved estimation of the position for the threat as a weighted combination of the estimated positions.

2. The method of claim 1, wherein calculating a weight value for each of the selected pair of bearings comprises determining a relative position of the aircraft at the time of each detected shot, and determining a difference in position of the aircraft between a first detected shot and a second detected shot for each of the plurality of selected pairs of bearings.

3. The method of claim 2, wherein calculating a weight value for each of the selected pairs of bearings comprises calculating the weight value for each selected pair as a function of the determined difference in position of the aircraft.

4. The method of claim 1, wherein selecting a plurality of pairs of bearings comprising selecting every possible pair of bearings from the plurality of determined bearings for which a difference in position of the aircraft between a first detected shot of a pair and a second detected shot of the pair exceeds a predetermined distance.

5. The method of claim 1, wherein calculating the improved estimation of the position for the threat comprises calculating a weighted average of the estimated positions from each set of bearings, such that the value of a coordinate defining the improved estimation of the position is equal to a weighted sum of associated coordinate values from the estimated positions divided by the sum of the calculated weight values.

6. The method of claim 1, wherein selecting a plurality of pairs of bearings comprises selecting a predetermined number of pairs of bearings for which respective differences in position of the aircraft between a first detected shot of each pair and a second detected shot of each pair have the largest values.

7. The method of claim 1, wherein selecting a plurality of pairs of bearings comprises identifying a proper subset of shots from the plurality of detected shots that represents a single burst of shots from an automatic weapon and selecting the plurality of pairs of bearings from determined bearings associated with shots within the identified proper subset of shots.

8. The method of claim 1, wherein determining an estimated position for the threat from each selected pair of bearings comprises determining respective intersection points associated with each selected pair of bearings.

9. The method of claim 1, further comprising calculating a confidence measure associated with the calculated improved estimation of the position for the threat.

10. A system for locating threats to an aircraft that are located on the ground, comprising:
a bearing determination element configured to determine associated bearings from an aircraft for each of a plurality of detected shots from a threat at ground level;
a position estimation element configured to determine an estimated position for the threat from each of a plurality of pairs of bearings; and
a position aggregation element configured to calculate an improved estimated position for the threat from the estimated positions.

11. The system of claim 10, the position estimation element comprising:
a burst definition element configured to identify a series of shots representing a single burst of shots from an automatic weapon;
a pair selection element configured to select a plurality pairs of shots, and their associated bearings, from the identified series of shots; and
a pair triangulation element configured to calculate an estimated position for each of the selected pairs of bearings.

12. The system of claim 10, the position aggregation element comprising:
a weight determination element configured to calculate a weight value for each of the plurality of pairs of bearings; and
an averaging element configured to calculate a weighted average of the plurality of estimated positions to provide the improved estimated position.

13. The system of claim 10, the bearing determination element comprising:
a shot identification element configured to receive data from an associated sensor and identify shots and respective associated times of the shots from the sensor data;
a bearing determination element configured to determine an associated bearing from the aircraft for each identified shot; and
a location determination element configured to determine a relative location of the aircraft at the associated time of each shot.

14. The system of claim 10, wherein the sensor comprises an image sensor that detects light in one of the visible spectrum and the infrared spectrum.

15. The system of claim 10, wherein the sensor comprises at least two acoustic sensors, and the bearing calculator is configured to calculate a bearing from respective times of arrival of a sound of a given shot at the at least two acoustic sensors.

16. A computer readable medium storing executable instructions that can be executed by a processor to locate threats to an aircraft that are located on the ground from sensor data, the executable instructions comprising:
a position estimation element configured to determine a plurality of estimated positions for a threat at ground level from the sensor data;
a weight determination element configured to calculate an associated weight for each of the estimated positions; and
an averaging element configured to calculate a weighted average of the estimated positions to provide an improved estimated position for the threat.

17. The computer readable medium of claim 16, the executable instructions further comprising:
a shot identification element configured to receive data from an associated sensor and identify shots and respective associated times of the shots from the sensor data;
a bearing calculator configured to determine an associated bearing from the aircraft for each identified shot; and
a location determination element configured to determine a relative location of the aircraft at the associated time of each shot.

18. The computer readable medium of claim 17, the position estimation element further comprising
a burst definition element configured to identify a series of shots in the identified shots that represents a single burst of shots from an automatic weapon; and
a pair selection element configured to select a plurality pairs of shots, and their associated bearings, from the identified series of shots; and
a pair triangulation element configured to calculate an estimated position for each of the selected pairs of bearings.

19. The computer readable medium of claim 18, the weight determination element being further configured to determine a difference in the position of the aircraft between the associated times of a first shot and a second shot represented by each pair of bearings and calculate a weight value for each of the selected pairs of bearings as a function of the determined difference in position of the aircraft associated with the pair of bearings.

20. The computer readable medium of claim 17, further comprising a user interface configured to provide the improved estimated position for the threat to an associated display for display to a user.

* * * * *